United States Patent
Suh

(10) Patent No.: US 8,243,203 B2
(45) Date of Patent: *Aug. 14, 2012

(54) APPARATUS FOR AUTOMATICALLY GENERATING VIDEO HIGHLIGHTS AND METHOD THEREOF

(75) Inventor: Jong Yeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 997 days.

This patent is subject to a terminal disclaimer.

(21) Appl. No.: 11/677,570

(22) Filed: Feb. 21, 2007

(65) Prior Publication Data

US 2007/0146549 A1   Jun. 28, 2007

Related U.S. Application Data

(63) Continuation of application No. 10/328,990, filed on Dec. 24, 2002, now Pat. No. 7,199,841.

(30) Foreign Application Priority Data

Dec. 28, 2001 (KR) .................................. 2001-87074

(51) Int. Cl.
*H04N 5/14* (2006.01)
*G06K 9/36* (2006.01)

(52) U.S. Cl. ........................................ 348/700; 382/232

(58) Field of Classification Search .................. 348/387, 348/390, 395, 397, 403, 411, 700, 669; 382/250, 382/252, 248, 238, 298, 245, 233, 235, 232, 382/236; 386/46, 83; 725/38

See application file for complete search history.

(56) References Cited

U.S. PATENT DOCUMENTS

| | | | |
|---|---|---|---|
| 4,683,494 A | | 7/1987 | Furukawa et al. |
| 5,805,733 A | * | 9/1998 | Wang et al. .................. 382/232 |
| 5,893,110 A | * | 4/1999 | Weber et al. ................ 707/104.1 |
| 5,909,548 A | * | 6/1999 | Klein et al. ................... 709/217 |
| 6,618,507 B1 | | 9/2003 | Divakaran et al. |
| 6,773,177 B2 | | 8/2004 | Denoue et al. |
| 7,032,177 B2 | | 4/2006 | Novak et al. |
| 7,199,841 B2 | * | 4/2007 | Suh .............................. 348/700 |
| 2002/0108112 A1 | | 8/2002 | Wallace et al. |
| 2002/0176507 A1 | | 11/2002 | Ju |
| 2007/0146549 A1 | | 6/2007 | Suh |

* cited by examiner

*Primary Examiner* — Behrooz Senfi

(74) *Attorney, Agent, or Firm* — Lee, Hong, Degerman, Kang & Waimey

(57) ABSTRACT

The present invention provides an apparatus and method for automatically generating moving picture highlights for video stored in a digital video recorder that detects scene change of stored video, extracts information amount with respect to the relevant video interval on the basis of the scene change detection information, automatically generates moving picture highlights according to moving picture highlight length information set by a user or default value in the system, on the basis of results of the scene change detection and the interval information amount.

28 Claims, 5 Drawing Sheets

FIG. 3a

| Y Signal | Bin index | Y Signal | Bin index | Y Signal | Bin index |
|---|---|---|---|---|---|
| 16-19 | 0 | 112-115 | 24 | 208-211 | 48 |
| 20-23 | 1 | 116-119 | 25 | 212-215 | 49 |
| 24-27 | 2 | 120-123 | 26 | 216-219 | 50 |
| 28-31 | 3 | 124-127 | 27 | 220-223 | 51 |
| 32-35 | 4 | 128-131 | 28 | 224-227 | 52 |
| 36-39 | 5 | 132-135 | 29 | 228-231 | 53 |
| 40-43 | 6 | 136-139 | 30 | 232-235 | 54 |
| 44-47 | 7 | 140-143 | 31 | | |
| 48-51 | 8 | 144-147 | 32 | | |
| 52-55 | 9 | 148-151 | 33 | | |
| 56-59 | 10 | 152-155 | 34 | | |
| 60-63 | 11 | 156-159 | 35 | | |
| 64-67 | 12 | 160-163 | 36 | | |
| 68-71 | 13 | 164-167 | 37 | | |
| 72-75 | 14 | 168-171 | 38 | | |
| 76-79 | 15 | 172-175 | 39 | | |
| 80-83 | 16 | 176-179 | 40 | | |
| 84-87 | 17 | 180-183 | 41 | | |
| 88-91 | 18 | 184-187 | 42 | | |
| 92-95 | 19 | 188-191 | 43 | | |
| 96-99 | 20 | 192-195 | 44 | | |
| 100-103 | 21 | 196-199 | 45 | | |
| 104-107 | 22 | 200-203 | 46 | | |
| 108-111 | 23 | 204-207 | 47 | | |

FIG. 3b

| Cb Signal | Bin Index | Cb Signal | Bin Index |
|---|---|---|---|
| 0-7 | 55 | 192-199 | 79 |
| 8-15 | 56 | 200-207 | 80 |
| 16-23 | 57 | 208-215 | 81 |
| 24-31 | 58 | 216-223 | 82 |
| 32-39 | 59 | 224-231 | 83 |
| 40-47 | 60 | 232-239 | 84 |
| 48-55 | 61 | 240-247 | 85 |
| 56-63 | 62 | 248-255 | 86 |
| 64-71 | 63 | | |
| 72-79 | 64 | | |
| 80-87 | 65 | | |
| 88-95 | 66 | | |
| 96-103 | 67 | | |
| 104-111 | 68 | | |
| 112-119 | 69 | | |
| 120-127 | 70 | | |
| 128-135 | 71 | | |
| 136-143 | 72 | | |
| 144-151 | 73 | | |
| 152-159 | 74 | | |
| 160-167 | 75 | | |
| 168-175 | 76 | | |
| 176-183 | 77 | | |
| 184-191 | 78 | | |

FIG. 3c

| Cr Signal | Bin index | Cr Signal | Bin index |
|---|---|---|---|
| 0-7 | 87 | 192-199 | 111 |
| 8-15 | 88 | 200-207 | 112 |
| 16-23 | 89 | 208-215 | 113 |
| 24-31 | 90 | 216-223 | 114 |
| 32-39 | 91 | 224-231 | 115 |
| 40-47 | 92 | 232-239 | 116 |
| 48-55 | 93 | 240-247 | 117 |
| 56-63 | 94 | 248-255 | 118 |
| 64-71 | 95 | | |
| 72-79 | 96 | | |
| 80-87 | 97 | | |
| 88-95 | 98 | | |
| 96-103 | 99 | | |
| 104-111 | 100 | | |
| 112-119 | 101 | | |
| 120-127 | 102 | | |
| 128-135 | 103 | | |
| 136-143 | 104 | | |
| 144-151 | 105 | | |
| 152-159 | 106 | | |
| 160-167 | 107 | | |
| 168-175 | 108 | | |
| 176-183 | 109 | | |
| 184-191 | 110 | | |

APPARATUS FOR AUTOMATICALLY GENERATING VIDEO HIGHLIGHTS AND METHOD THEREOF

CROSS-REFERENCE TO RELATED APPLICATIONS

This application is a continuation of U.S. patent application Ser. No. 10/328,990, filed on Dec. 24, 2002, now U.S. Pat. No. 7,199,841, which claims the benefit of earlier filing date and right of priority to Korean Application No. 2001-0087074, filed on Dec. 28, 2001, the contents of which are hereby all incorporated by reference herein in their entirety.

BACKGROUND OF THE INVENTION

1. Field of the Invention

The present invention relates to an apparatus and method for automatically generating moving pictures highlights of video stored in a digital video storing device using scene change detecting algorithm.

2. Description of the Related Art

Generally, digital video content is delivered by a broadcasting system based on wired and wireless media such as a digital TV, and a user can store the digital video content using a storing device such as a PVR (Personal Video Recorder) as well as watch the digital video content.

Though the whole content of the stored digital video may be played and watched by a user, moving picture highlights of summarized type is also provided by a program supplier or automatically generated by a system in a user side so that a user could understand the content without watching the whole video in some cases.

The moving picture highlights are provided for playing important part of the stored video, while representing the whole relevant video stream.

The moving picture highlights are provided for separately storing or playing a specific interval of the video stream, and in case that a user wants to select and watch one of many videos stored in a digital video recorder for a limited time period, a user could save time necessary for searching the desired video content by playing only moving picture highlights for each video stream.

Also, the moving picture highlights could also provide a preview function that may be used for a program guide apparatus necessary for a user selecting video to be recorded in the digital video storing device besides summary information of the stored video stream.

As the moving picture highlight should separately extract meaningful part representing the video content for a user, determination of interval for which moving picture highlights would be generated is very complicated.

The method of the related art adopts a method that the program supplier separately produces moving picture highlights. But, in case of a program not providing highlights, it has a problem that there is no way for a user to obtain information regarding each program within limited time if a user recorded a plurality of programs simultaneously.

Therefore, in order to resolve the foregoing problem, a method for automatically generating these highlights is required.

Also, as the method of the related art generates the highlights by simply inputting time information, there is a problem that the related art method is unsatisfactory for automatic generation of the highlights such that the highlights begins at an actual scene change point.

Namely, according to the method of the related art, it is difficult to generate moving picture highlights for the digital video in automated fashion, and extraction of the part substantially summarizing the moving picture content in viewpoint of meaning is weak and performance or reliability in automatic generation of the highlights using the extracted part is insufficient.

SUMMARY OF THE INVENTION

An object of the invention is to solve at least the above problems and/or disadvantages and to provide at least the advantages described hereinafter.

Accordingly, one object of the present invention is to solve the foregoing problems by providing an apparatus and method for generating moving picture highlights of video stored in storing devices such as a PVR (Personal Video Recorder) and, more specifically, an apparatus and method for generating moving picture highlights by dividing the stored video into intervals according to scenes using a scene change detecting algorithm, and by determining the interval to be generated as the highlights based on information amount of each interval.

Another object of the present invention is to provide an apparatus and method for generating moving picture highlights corresponding to a length of a moving picture highlight selected by a user in case that the user intends to record a specific program in order to provide highlights of a desired length.

The foregoing and other objects and advantages are realized by providing an apparatus for automatically generating moving picture highlights including: a scene change detecting means for detecting a scene change point of a stored digital video; an interval information amount estimating means for estimating interval information amount for a predetermined interval on the basis of the detected scene change points; a highlight generating means for generating moving picture highlights according to the estimated interval information amount and predetermined moving picture highlight length information.

The foregoing and other objects and advantages are realized by a method for automatically generating moving picture highlights including the steps of: dividing digital video into intervals of a scene unit by detecting a scene change point of stored digital video; estimating information amount for each divided interval as a value proportional to bit numbers of each frame in the relevant interval in order to determine importance of a scene; selecting a reference scene to be included in highlights according to the estimated interval information amount; generating moving picture highlights by including video stream of a predetermined interval having a reference scene according to the selected reference scene.

Therefore, according to the present invention, functions such as a division of video interval by scene change detection in the digital video storing device and imposing importance to each scene by estimation of information amount for each scene interval are provided, and an apparatus and method for automatically generating highlights on the basis of the above two functions are provided.

As a DC image of I-picture is used for detecting a scene change, the present invention can minimize hardware costs and time consumption required to generate highlights. According to the present invention, importance of each reference scene for highlight generation is estimated on the basis of information amount and highlights are automatically generated on the basis of the scene selected according to degree of the importance, so that moving picture highlights reflecting substantially meaningful content can be provided.

Also, the present invention is applicable to content summary for video stream, fast searching of the stored videos and other application field related to moving picture highlight generation in a personal video recorder or a digital program guide supplied by a broadcasting station, and the present invention can provide a user with more effective and automatically generated moving picture highlights.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 3a, 3b, 3c are tables representing mapping between pixel values and histogram bins for detecting scene change according to the present invention;

DETAILED DESCRIPTION OF PREFERRED EMBODIMENTS

The following detailed description will present an apparatus and method for automatically generating moving picture highlights according to a preferred embodiment of the invention in reference to the accompanying drawings.

Figure 1:
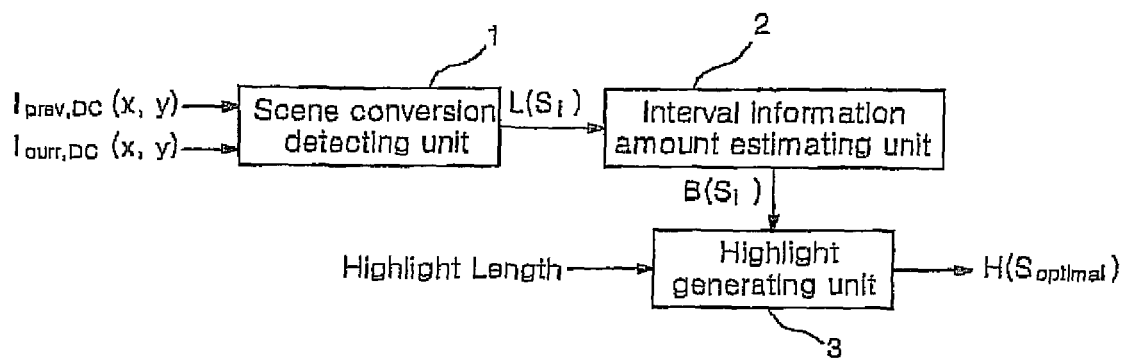
FIG. 1 is a block diagram of an apparatus for automatically generating moving picture highlights of the present invention.

FIG. 1 is an embodiment of an apparatus for generating digital moving picture highlights of the present invention. The apparatus includes a scene change detecting unit 1 for detecting scene change of the video; an interval information amount estimating unit 2 for estimating information amount of the divided interval using the scene change detecting information; a highlight generating unit 3 for generating highlights using the estimated interval information amount and highlight length information.

The scene change detecting unit 1 detects scene change for the stored digital video. A frame where scene change occurs becomes a starting point of each scene and the stored digital video is divided by unit of scene.

If scene change detecting operation is completed, the scene change detecting unit 1 transmits a frame list L(Si) constituting each divided scene to the interval information amount estimating unit 2. The inverval information amount estimating unit 2 estimates importance of each scene on the basis of bit amount and sends information amount B(Si) of the each interval to the highlight generating unit 3.

The highlight generating unit 3 determines a $S_{optimal}$, which is an interval for which moving picture highlight is generated corresponding to a highlight length selected by a user or default value.

Figure 2:
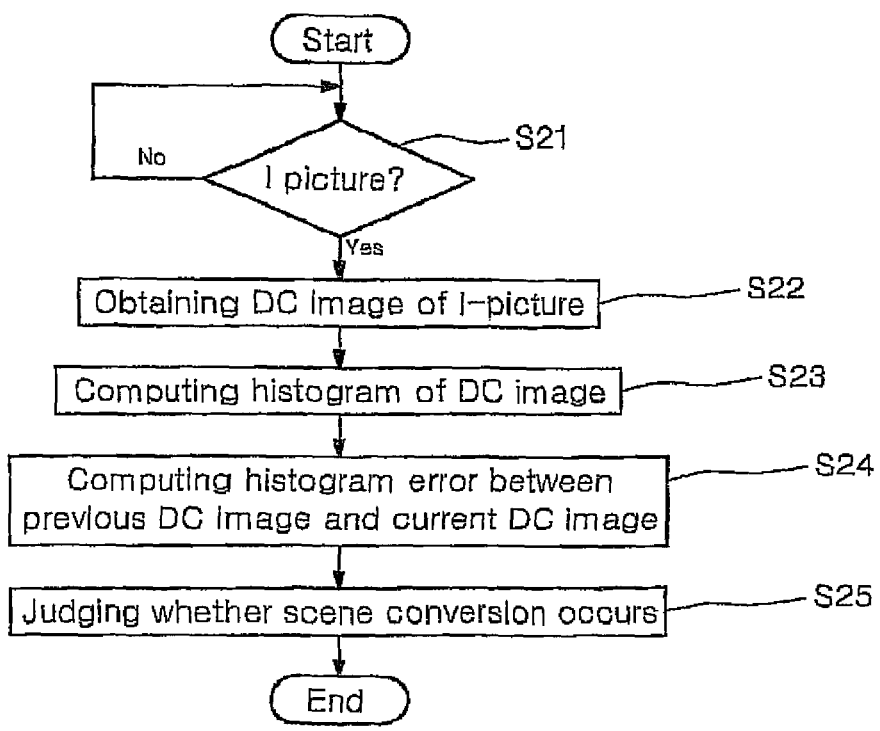
FIG. 2 is a flowchart explaining a method for detecting scene change according to the present invention.

FIG. 2 is a flowchart explaining scene change detecting operation by the scene change detecting unit 1, which includes the steps of: judging input of I-pictures (S21); acquiring a DC image of the I-picture (S22); calculating histogram of the DC image (S23); calculating error between the histogram of the previous DC image and histogram of the current DC image; and judging whether scene change occurs or not according to the error range (S25).

In order to detect scene change, a method for comparing the stored video frames is used. Comparing video signals at the point where scene change occurs, it shows that video difference between the previous frame and the current frame, particularly difference in histograms is big. Therefore, such a phenomenon is used.

In the meantime, in case of detecting scene change in every frame, it should be considered that burdens for hardware and time are increased due to increase of required operation amount.

Also, in order to use a method for comparing decoded video by completely decoding the frame, a variable length decoder should be used and, in that case, much time should be taken for generating digital video highlights than playing the relevant video. Therefore, the present invention detects scene change using only I-picture without detecting scene change in every frame in order to resolve such burden in hardware and time.

Actually, in order to detect scene change by unit of frame exactly, scene change detection should be performed for P-picture and B-picture as well as I-picture. But considering additional burden in the hardware and time for realization of exact detection, such method is not advantageous compared to the method using only I-picture according to the present invention.

For example, in case of MPEG (Moving Picture Experts Group) video stream where N=15, when scene change point is determined using I-picture only, a frame where the actual scene change occurs exists between the current I-picture and the previous I-picture.

But, at the moment, maximum error with the exact scene change point is 14frames, which is merely taken for $14/30$ seconds.

Therefore, considering trade-off between hardware and time burdens, the present invention detects scene change using only I-picture.

Also, in order to simplify decoding process of I-picture much more, the present invention uses DC value by parsing only DC value without completely restoring I-picture. This DC value is a kind of reduced image reflecting characteristics of the original image, so that comparison of DC values (DC images) possibly shows sufficient performance as if the original image were compared.

In the foregoing, the DC is a coefficient in frequency region converted into DCT during video coding process, which is the coefficient that frequency is corresponding to zero; it has a meaning of average.

Namely, the scene change detecting unit 1 uses the DC value (DC image) of the I-picture and also uses the histogram in order to compare DC image of the I-picture of the present and before. Therefore, the input of the scene change detecting unit 1 becomes the DC image of the previous I-picture (Iprev, DC(x,y)) and the DC image of the current I-picture (Icurr,DC (x,y)).

The DC image provided to the scene change detecting unit 1 has three signals such as Y, Cb, Cr (these signals may be changed depending on color space applied), and the histogram for input image is computed based on tables of FIGS.

3a, 3b, 3c, defining mapping between each pixel value of the input image and the relevant histogram bin.

As is apparent from tables of FIGS. 3 (3a, 3b, 3c), the present invention computes one-dimensional histogram for Y,Cb,Cr, of pixel value for each image, respectively. Here, Y is divided by 55 in total; Cb and Cr are divided by 32 and 32 levels, respectively.

A histogram error E between the current image and the previous image is calculated by the formula 1.

$$E = \frac{1}{N_Y + N_{CB} + N_{CR}} \sum_{n=0}^{110} \text{abs}(H_1(n) - H_2(n)) \quad \text{[Formula 1]}$$

Here, $H_1(n)$ and $H_2(n)$ stand for frequency of nth bin of a first image and frequency of nth bin of a second image, respectively, and $N_Y$, $N_{CB}$, $N_{CR}$ stand for Y coefficient, Cb coefficient, Cr coefficient of the DC image, respectively. Generally, in the image of 4:2:0 format, the size of the $N_Y$ is four times greater than that of the $N_{CB}$ or $N_{CR}$.

Detailed description for the foregoing information will be made in the following. In the above, bin means a value representing a predetermined range of brightness signal or color difference signal in an image when generating histogram data.

Namely, when Y signal is divided by 55 levels, 55 bins exist from No. 0 to No. 54. Referring to the tables of FIGS. 3 (3a, 3b, 3c), Y signal could have a value between 16 and 235, and at the moment, if values of brightness signal are equally divided by 4, then total 55 levels exist.

Also, the Cb and Cr could have a value between 0 and 255, and if values of each color difference signal are equally divided by 8, then total 32 levels exist.

In the above, upon generation of histogram, brightness signal is divided by 4 and the color difference signal is divided by 8, so that brightness signal is divided in more detail.

In the meantime, the formula 1, which is a formula for deriving histogram error, is used for obtaining bin-to-bin difference. Considering an image of 4:2:0 whose size is 8×8, it is given that NY=64, NCb=16, NCr=16.

For example, for histogram of No. 1 I-picture, presuming that the following results is obtained:

No. 20 bin: 30, No. 25 bin: 14, No. 30 bin: 20, No. 60 bin: 7, No. 83 bin: 9, No. 95 bin: 10, No. 110 bin: 6.

Namely, H1(0)=0, H1(20)=30, H1(25)=14, . . .

Also, for histogram of No. 2 I-picture, presuming that the following results is obtained:

No. 19 bin: 5, No. 20 bin: 25, No. 25 bin: 10, No. 30 bin: 24, No. 60 bin: 9, No. 80 bin: 7, No. 95 bin: 10, No. 105 bin: 6

Namely, H2(0)=0, . . . , H2(19)=5, H2(20)=25, . . .

Therefore, histogram error between the two images could be obtained by the formula 1 as follows.

(1/(64+16+16))*(|0-5|+|30-25|+|14-10|+|20-24|+|7-9|+|0-7|+|9-0|+|10-10|+|0-6|+|6-0|)

In the meantime, the scene change detecting unit 1 of the present invention judges whether a scene change occurs or not by outputting a scene change occurrence parameter SC (Scene Change) having two bits in its size according to the following criteria.

Namely, (a) if E 0.2, then SC='00' (no change: there is no scene change), (b) if 0.2<E 0.55, then SC='01' (gradual scene change), (c) if E>0.55, then SC='10' (hard cut abrupt scene change). Here, values given for comparison criteria in judgment of scene change may be changed into other values considering variety of environments such as velocity or accuracy. As mentioned above, SC outputs one value among '00', '01', '10' according to the range of error value E.

Figure 4:
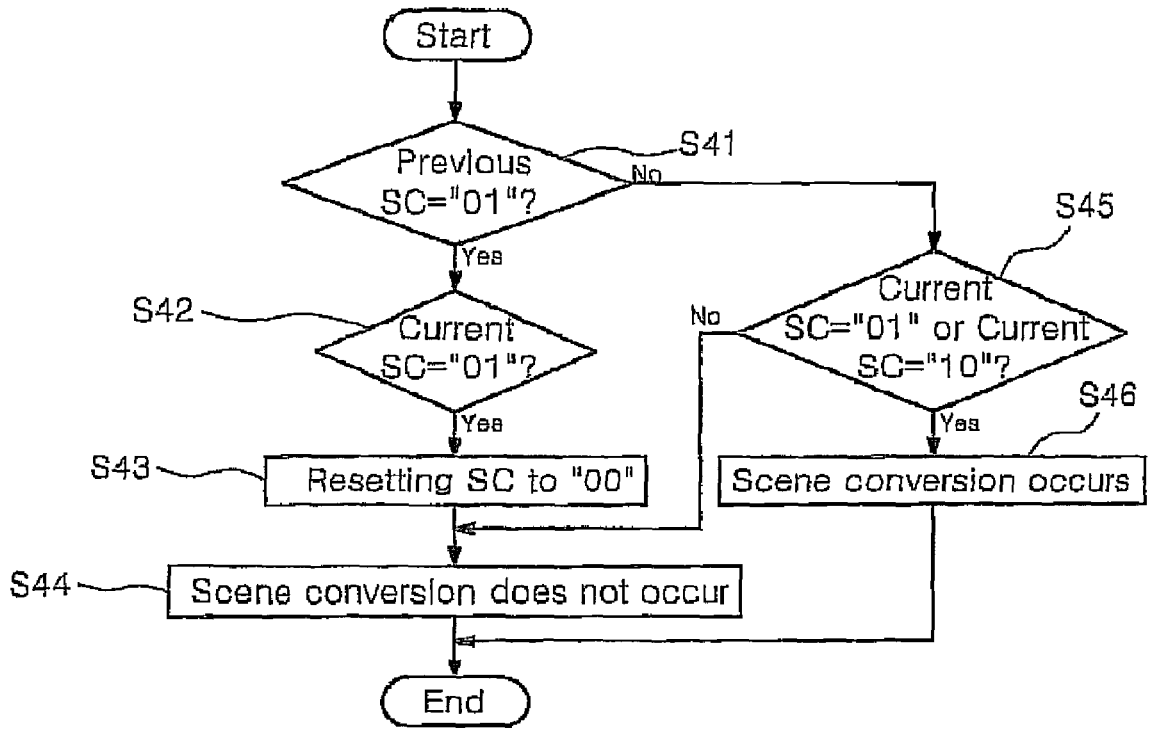
FIG 4 is a flowchart explaining a method for determining a scene change starting point upon detection of scene change according to the present invention.

Operation process for determining starting point of scene change at the scene change detecting unit 1, illustrated in FIG. 4.

The process includes the steps of: judging whether the previous SC is '01' (gradual scene change)(S41); judging whether the current SC is also '01' (gradual scene change) if the previous SC is '01' (S42) resetting the current SC to '00' (no scene change) if the previous and the current SC are all '01' (S43), and then judging that scene change does not occur (S44); and judging whether the current SC is '01' (gradual scene change) or '10' (abrupt scene change) in case that the previous SC is not '01' (gradual scene change)(S45).

In step 45 (S45), if SC='01' or SC='10', then it is judged that scene change occurs (S46), otherwise, it is judged that scene change does not occur (S44).

According to FIG. 4, scene change is finally judged by the SC value. If the SC value is '01' (gradual scene change) and if gradual scene change occurs in the next image, then SC is output as '00'.

The reason is to consider frames belonging to the interval where the gradual scene change occurs as one scene. Therefore, in case that the SC values are '01' in succession, the rest is reset to '00' except the first '01'.

In the meantime, the interval information amount estimating unit 2 determines the average value of information amount of all frames belonging to the interval of each scene obtained by the foregoing process as information amount of the relevant interval, which could be given by the following formula 2.

$$B(Si) = \frac{1}{NFi} \sum K(j) \quad \text{[Formula 2]}$$

Here, K(j) stands for a parameter value proportional to bit numbers of jth frame, NFi stands for the number of frames belonging to a scene Si, and j stands for frame index belongs to the scene Si for which current information amount would be estimated.

In such interval information amount estimation, information amount K(j) for the I-picture belonging to the gradual scene change interval is forcibly reset to '0'. The reason is that the moving pictures belonging to the gradual scene change interval, provide a user (or audience) with visually unclear images, therefore, such moving pictures are not suitable for highlights.

According to the present invention, in order to estimate bit numbers for each frame, bit numbers are not directly computed, instead, estimation of information amount for frame and the relevant scene interval is performed using a value proportional to the number of bits.

More specifically, MPEG video stream already uses coded vbv_delay, which is based on formula for bit rate R(n) described in ISO/IEC (International Organization for Standardization/International Electrotechnical Commission) 13818-2, MPEG standard. Here, R(n) could be described as follows:

$$R(n) = d*_N/(\tau(n) - \tau(n+1) + t(n+1) - t(n))$$

Here, d*N means total number of bits from the last bit of nth picture start code to the last bit of n+1th picture start code, so that R(n) is proportional to the actual picture data amount of nth frame.

In the meantime, the R(n) as described above is a constant at the point that the current frame is decoded, so that resultantly, d*N is directly proportional to τ(n) meaning vbv_delay.

In conclusion, according to the present invention, as a reference for estimating information amount of each scene interval, vbv_delay coded by 16 bits at picture header of each frame is used.

Therefore, in the formula 2, K(j) uses vbv_delay value. Information amount of each scene is used for criterion in computing importance of the scene, and the present invention generates highlights for the scene of high importance.

In the above, vbv in vbv_delay stands for video buffering verifier, which is virtual buffer used as reference in order to prevent overflow and underflow of decoder in consideration of bit rate of data when video is coded by MPEG-2.

Therefore, if the vbv_delay value is large as a result of referring to vbv_delay value, it may be considered that data is relatively large (See Annex C of MPEG-2 standard).

Figure 5:
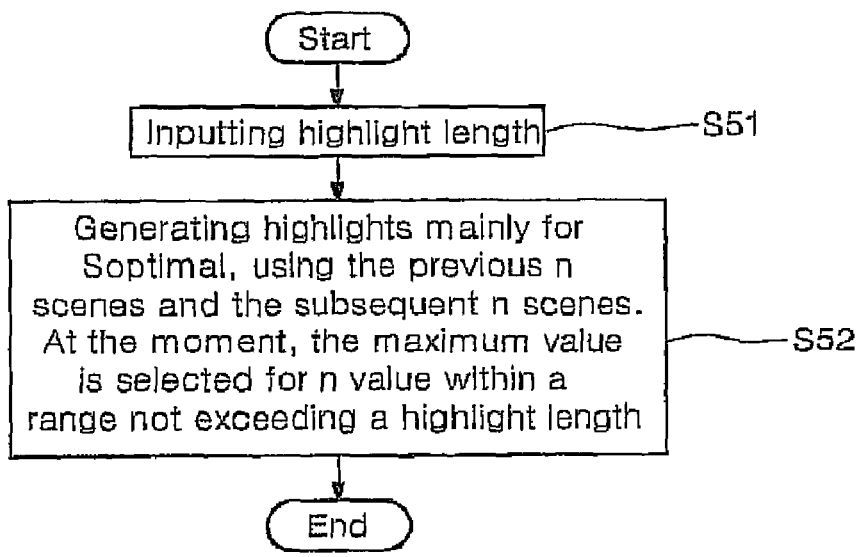
FIG 5 is a flowchart explaining a method for generating highlights according to the present invention.

FIG. 5 is a flowchart explaining operation of a highlight generating unit 3 according to the present invention, which includes the steps of: inputting highlight length information for the moving picture highlights (S51); generating highlights using the previous n scenes and the subsequent n scenes (S52) on the basis of the reference scene $S_{optimal}$ (But, n is the maximum value within the range not exceeding the highlight length).

FIG. 5, according to the present invention, moving picture highlights are generated as much as highlight amount information (time length of the moving picture highlights) selected by a user, or as much as 'highlight length' predetermined by the system as default in case that the user does not input such highlight information.

In order for the foregoing process, the highlights are generated using the previous n scenes and the subsequent n scenes on the basis of the reference scene $S_{optimal}$ having largest information amount, selected based upon results estimated by the interval information amount estimating unit 2 in the preceding step.

At the moment, size of n is determined to be the largest value among K values satisfying the following formula 3.

$$\sum_{j=-K}^{j=K} T(i+j) \le HighlightLength \quad \text{[Formula 3]}$$

Here, T(i) stands for time consumed when the moving picture corresponding to ith scene is displayed.

Therefore, 2n scenes are generated for highlights on the basis of Soptimal centered.

Also, plurality of primary scenes, not a single primary scene, could be set to generate highlights. Such process is performed in the following manner, in which: the scene having the largest information amount is selected on the basis of the results estimated by the interval information amount estimating unit 2; after that, the scene to be selected for other primary point is determined in consideration of time interval and size of information amount.

For example, in case of generating highlights using M primary scenes, a value obtained by the highlight length as divided by M is used for the moving picture amount of each primary scene.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for generating a video highlight from video data in a video system comprising a video segment detecting unit and a highlight generator, the method comprising:
   dividing in the video segment detecting unit the video data into at least a first video segment and a second video segment, wherein a first image is associated with the first video segment and a second image is associated with the second video segment; and
   generating the video highlight by selecting a plurality of images from at least one of the first video segment and the second video segment based on an amount of interval data, wherein the video highlight comprises the plurality of images and is generated based on a reference image determined according to the amount of interval data.

2. The method of claim 1, wherein the video data comprises video data recorded on a storage medium.

3. The method of claim 1, wherein the video data comprises streaming video.

4. The method of claim 1, wherein the video highlight is stored in a storage medium.

5. The method of claim 1, further comprising generating the second image in the second video segment after the first image in the first video segment.

6. The method of claim 1, wherein the video highlight is further generated from images in at least one of the first video segment and the second video segment selected based on importance.

7. The method of claim 1, wherein the video highlight is further generated from images in at least one of the first video segment and the second video segment that have a first level of importance.

8. The method of claim 1, wherein the video highlight excludes images in at least one of the first video segment and the second video segment that are not associated with a first level of importance.

9. The method of claim 1, wherein the at least the first video segment and the second video segment are divided based on scene change points in the video data.

10. The method of claim 1, wherein the plurality of images are selected based on a user input providing a preferred length for a duration of the video highlight comprising the plurality of images and the amount of interval data.

11. A system for generating a video highlight from video data, the system comprising:
   a segment detector for dividing the video data into at least a first video segment and a second video segment prior to generating the video highlight, wherein a first image is associated with the first video segment and a second image is associated with the second video segment; and
   a highlight generator for generating the video highlight by selecting a plurality of images from at least one of the first video segment and the second video segment based on an amount of interval data, wherein the video highlight comprises the plurality of images and is generated based on a reference image determined according to the amount of interval data.

12. The system of claim 11, wherein the video data comprises video data recorded on a storage medium.

13. The system of claim 11, wherein the video data comprises streaming video.

14. The system of claim 11, wherein the video highlight is stored in a storage medium.

15. The system of claim 11, further comprising generating the second image in the second video segment after the first image in the first video segment.

16. The system of claim 11, wherein the video highlight is further generated from images in at least one of the first video segment and the second video segment selected based on importance.

17. The system of claim 11, wherein the video highlight is further generated from images in at least one of the first video segment and the second video segment that have a first level of importance.

18. The system of claim 11, wherein the video highlight excludes images in at least one of the first video segment and the second video segment that are not associated with a first level of importance.

19. The system of claim 11, wherein the at least the first video segment and the second video segment are divided based on scene change points in the video data.

20. The system of claim 11, wherein the plurality of images are selected based on a user input providing a preferred length for a duration of the video highlight.

21. The method of claim 1, further comprising estimating the amount of interval data for each of the at least first and second video segments, wherein the reference image is determined according to the first or second video segment having a greater amount of interval data.

22. The method of claim 1, further comprising estimating the amount of interval data for each of the at least first and second video segments,
wherein the video highlight is further generated based on at least the first or second video segments selected according to a degree of importance determined using the estimated amount of interval data.

23. The method of claim 1, wherein the amount of interval data is determined by an average value of amounts of information of all images in an interval of the at least first or second video segment.

24. The system of claim 11, wherein the amount of interval data is determined by an average value of amounts of information of all images in an interval of the at least first or second video segment.

25. The system of claim 11, wherein the video highlight is generated using 'n' previous images and 'n' subsequent images of the plurality of images with respect to the reference image.

26. The method of claim 1, wherein the reference image is positioned at a center of the video highlight.

27. The method of claim 1, wherein the reference image comprises a largest amount of information among the plurality of images.

28. The system of claim 11, wherein the reference image is one of the plurality of images.

\* \* \* \* \*